United States Patent [19]
Breden et al.

[11] Patent Number: 5,166,589
[45] Date of Patent: Nov. 24, 1992

[54] LEVEL PROBE FOR A SHAFT FURNACE

[75] Inventors: Emile Breden, Godbrange; Emile Lonardi, Bascharage; Edgar Kraemer, Hellange, all of Luxembourg

[73] Assignee: Paul Wurth S. A., Luxembourg

[21] Appl. No.: 810,544

[22] Filed: Dec. 19, 1991

Related U.S. Application Data

[63] Continuation of Ser. No. 604,139, Oct. 24, 1990, abandoned.

[30] Foreign Application Priority Data

Nov. 3, 1989 [LU] Luxembourg .................. 87617

[51] Int. Cl.⁵ .................................. G01B 3/10
[52] U.S. Cl. ........................... 318/642; 318/652; 318/560; 318/432; 33/715; 33/716
[58] Field of Search .............. 33/552, 555, 713–720; 73/309–321; 318/430–434, 456, 482, 493, 476, 259, 742, 779, 798, 799, 802, 807, 808, 809

[56] References Cited

U.S. PATENT DOCUMENTS

| | | | |
|---|---|---|---|
| 3,887,855 | 6/1975 | Klimo | 318/434 X |
| 3,947,738 | 3/1976 | Oliver | 318/599 X |
| 3,965,403 | 6/1976 | Okado | 318/143 |
| 3,965,407 | 6/1976 | Stoner | 318/432 |
| 3,969,941 | 7/1976 | Rapp | 318/482 X |
| 4,207,508 | 6/1980 | Habisohn | 318/742 |
| 4,236,314 | 12/1980 | Schmidt et al. | 33/715 |
| 4,272,706 | 6/1981 | Somerville | 318/802 X |
| 4,326,337 | 4/1982 | Akimoto et al. | 33/716 |
| 4,556,830 | 12/1985 | Schwalm et al. | 318/434 X |
| 4,574,494 | 3/1986 | Mailliet et al. | 33/552 |
| 4,910,878 | 3/1990 | Fleckenstein et al. | 73/321 |
| 4,953,053 | 8/1990 | Pratt | 318/465 |
| 4,965,847 | 10/1990 | Jurkowski et al. | 388/814 |
| 4,971,522 | 11/1990 | Butlin | 318/808 |
| 4,975,979 | 12/1990 | Baird | 388/814 |
| 5,027,049 | 6/1991 | Pratt et al. | 318/807 |

Primary Examiner—Paul Ip
Attorney, Agent, or Firm—Fishman, Dionne & Cantor

[57] ABSTRACT

A probe includes a probe foot which is suspended on a cable or a chain attached to a winding drum mounted in a sealed casing above the furnace and which communicates with the interior of the latter via a vertical sleeve passing through the upper wall of the furnace, an electric motor associated with a reducer for actuating the winding drum, and a device for detecting the unwinding and winding up of the winding drum in order to control the speed and torque of the motor. The motor is a servomotor, the speed and torque of which are controlled automatically as a function of the detection device by comparison of the actual speed of the motor with data of desired values dependent on the position of the probe foot.

8 Claims, 3 Drawing Sheets

LEVEL PROBE FOR A SHAFT FURNACE

This is a continuation of copending application Ser. No. 07/604,139 filed on Oct. 24, 1990, now abandoned.

BACKGROUND OF THE INVENTION

Level probes for shaft furnaces are well known and are used for determining the level of the charging surface of a furnace, especially for determining the beginning and end of a charging session. These probes must satisfy a plurality of requirements and criteria of which the effects are often contradictory. For example, as regards the operating speed of the probe foot for lowering it onto the charging surface and for raising it, it is desirable that the speed of the drum be relatively high in order to avoid losses of time. In contrast, if the lowering speed of the probe foot is high, the latter risks penetrating into the charging material and thus falsifying the measurement results. The speed of the motor must therefore be determined so as to find a reasonable compromise between these two constraints.

Another problem is the increasing in the torque exerted on the motor during the lowering of the probe foot onto the charging surface. In fact, as the unwinding progresses, the weight of the chain or cable is added to that of the probe foot, and this increase in torque, coupled with the same braking torque of the motor, increases the lowering speed of the probe foot. Now it is exactly the opposite which is desired, that is to say a slowing of the probe foot as it approaches the charging surface, precisely to prevent it from penetrating into the charging surface.

Another problem is that the necessary measures have to be taken to prevent the probe foot from overturning after it comes into contact with the charging surface, that is to say it is necessary to ensure that the probe foot remains upright on the charging surface and descends together with this, without overturning, otherwise the measurement results would be falsified. Consequently, when the probe foot touches the charging surface, the torque of the motor must be increased, care nevertheless being taken to ensure that this increase in torque is not too great, to avoid lifting the weight again.

Slip-ring motors with rotor resistors which can be connected and disconnected, as required, in order to modify the torque of the motor have conventionally been used to satisfy the above discussed constraints.

When the probe is to be lowered onto the charging surface, the motor torque is adjusted by means of the rotor resistors to a specific value below the lowering torque generated by the probe foot and corresponding to a specific lowering speed. To compensate the increase of the lowering torque as a result of the increase in weight of the unwinding cable and to keep the lowering speed of the probe foot constant, the torque of the motor is increased progressively by means of the rotor resistors.

At the moment when the probe foot touches the charging surface, the value of the rotor resistors is further reduced, in order to increase the motor torque to a sufficient value to keep the probe foot in an upright position, but without lifting it from the charging surface, so as to allow it to descent together with the latter.

The various modifications of the rotor resistors to determine the torque of the motor are carried out automatically under the control of means for detecting the position of the probe foot, this being by means of a predetermined calibration which makes it possible to adjust the various moments of modification of the resistors according to the position of the probe foot.

Although this system has been in operation for years, it nevertheless has a certain number of disadvantages which become increasingly evident as technological advances are made. Thus, for example, the calibration of the probe and the adjustment of the various values of the rotor resistors are jobs for specialists and have to be repeated regularly because the running conditions of the furnace bring about unforeseeable changes in the lowering torque of the probe. These changes in the torque can be caused by fluctuations in the temperature of the lubricant, the soiling of the drum and of the chain, the wear of the glands of the bearings of the motor and of the reducer, etc. Moreover, the calibration and adjustment of the values of the resistors can be carried out only during a shutdown of the furnace. Now it goes without saying that a poor adjustment of the values of the resistors gives rise to measuring inaccuracies.

To have a sufficiently wide range of adjustment and thereby make this work easier, while at the same time allowing for the variations in the mechanical efficiency, it is necessary to provide somewhat heavy equipment, particularly a probe foot weighing between 100 and 250 kilos. Because of this high weight, it is necessary to operate at relatively low speeds, to prevent the probe foot from penetrating into the charging material.

Furthermore, the slip-ring motor requires regular maintenance because of the wear of its brushes and rotor rings

SUMMARY OF THE INVENTION

The object of the present invention is to provide a new level probe which is simpler and lighter and needs less maintenance and which no longer requires regular adjustments and calibrations.

The present invention relates to a level probe for a shaft furnace, comprising a probe foot which is suspended on a cable or a chain attached to a winding drum mounted in a sealed casing above the furnace and which communicates with the interior of the latter via a vertical sleeve passing through the upper wall of the furnace, an electric motor associated with a reducer for actuating the winding drum, and means for detecting the unwinding and winding up of the winding drum in order to control the speed and torque of the motor.

The level probe of the present invention is essentially characterized in that the motor is a servomotor, the speed and torque of which are controlled automatically as a function of the means for detecting the unwinding and winding up of the drum by comparison of the actual speed of the motor with data of desired values dependent on the position of the probe foot.

The feed of the motor is controlled by a static converter as a function of a speed transmitter measuring the actual speed of the motor and under the control of desired-value signals supplied by a control unit according to the position of the probe foot detected by the said means for detecting the winding up and unwinding of the cable.

The current of the motor is controlled by means of a torque-regulating loop under the control of desired values supplied by the control unit according to the position of the probe foot.

The probe provided by the present invention no longer needs adjustment on the spot, because the lowering speed of the probe foot and the motor torque are adjusted automatically by two regulating loops.

Maintenance can be reduced since the servomotor no longer has any wearing part.

The equipment can be much lighter, as the system is more sensitive and makes it possible to work with weights of the order of a few kilos. A lighter probe foot thus makes it possible to increase the operating speeds.

Moreover, the probe provided by the invention makes it possible to carry out much more accurate measurements because of the automatic compensation of the variations in the lowering torque.

The energy consumption of the probe provided by the present invention is substantially reduced as a result of smaller equipment and a higher efficiency of the motor used.

In a preferred embodiment, a limit stop is provided in the sleeve, to fix the reference position of the probe foot which serves for an automatic calibration of the said means for detecting the winding up and unwinding of the cable, especially for the automatic zero setting of these means when the probe foot is in its parking position.

In fact, it must be remembered that, because of the high temperatures prevailing above the charging surface, the cable or chain is elongated, the more, the higher the weight of the probe foot. Now in view of the fact that detection means determine the position of the probe foot by the degree of unwinding or winding up of the drum, elongation of the cable or of the chain necessarily gives rise to false measurements. Whereas, in conventional probes, such as elongation made it necessary to carry out a new adjustment of the detection means, involving local action under difficult working conditions, the level probe according to the present invention allows an automatic calibration of the detection means by their zero resetting.

BRIEF DESCRIPTION OF THE DRAWINGS

Other particular features and characteristics will emerge from the detailed description of an advantageous embodiment given below by way of illustration, with reference to the accompanying drawings, in which.

DETAILED DESCRIPTION OF THE INVENTION

Figure 1:
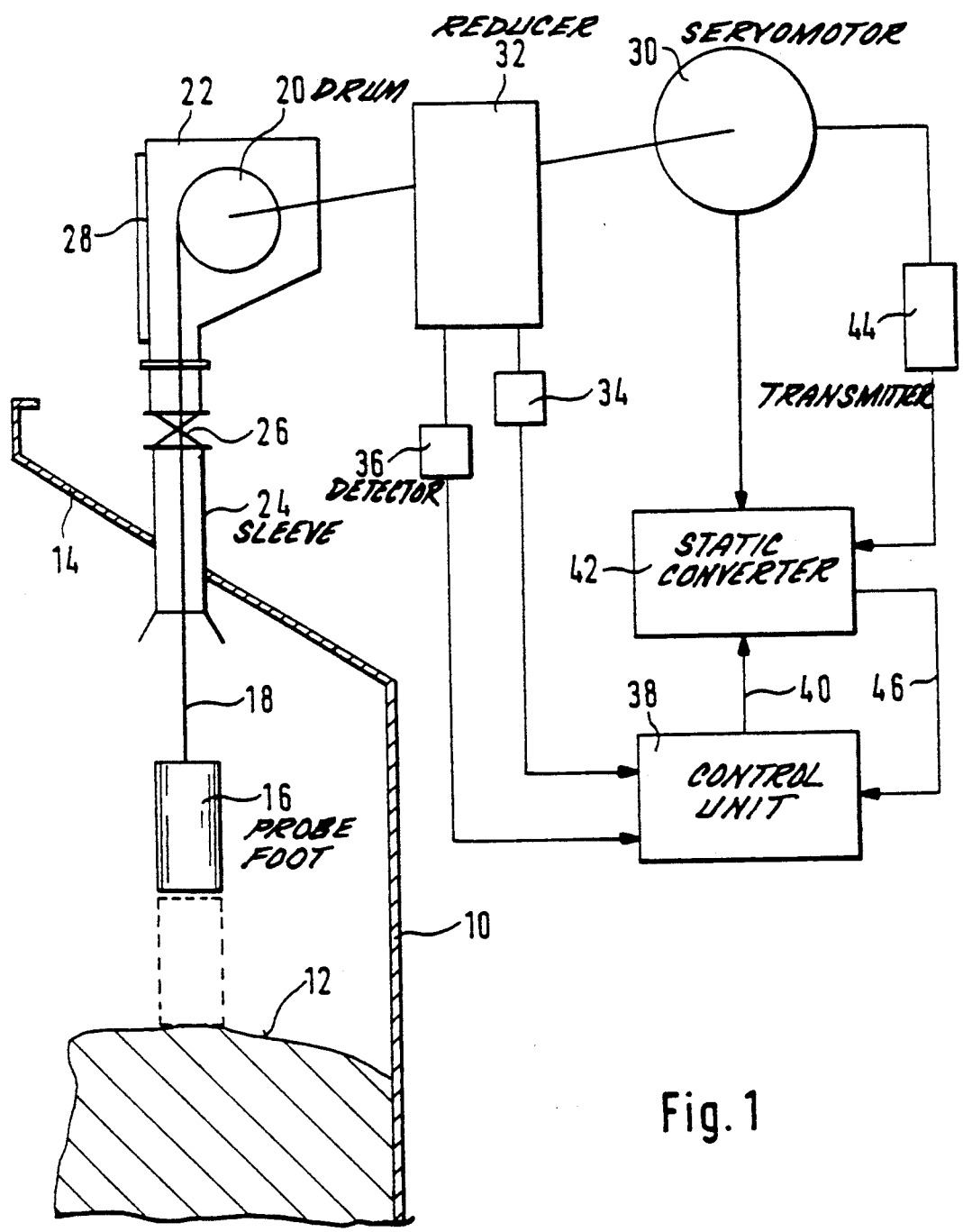
FIG. 1 shows a block diagram of a probe according to the present invention.

FIG. 1 shows diagrammatically a blast furnace 10, the level 12 of the charging material of which is to be determined and monitored. For this purpose, a level probe is mounted in the oblique section 14 of the wall of the blast furnace 10. The level probe consists essentially of a weight or probe foot 16 attached to the free end of a chain or of a cable 18, the other end of which is fastened to a drum 20 mounted in a sealed casing 22 above the oblique section 14 of the wall of the furnace 10. This casing 22 communicates with the interior of the furnace by means of a vertical tubular sleeve 24 fastened in the oblique section 14 of the furnace wall. The lower edge of this sleeve 24 is funnel-shaped, to allow the probe foot 16 to enter the sleeve 24 in the parking position.

To make it possible to remove the probe foot 16, without the need to interrupt the running of the furnace, the sleeve 24 has a valve 26 which makes it possible to isolate the upper part of the casing 22 from the interior of the furnace 10. When the probe foot 16 is raised above this valve 26 and after the latter has been closed, the foot 16 can be freed from the casing 22 via a door 28.

The drum 20 is actuated by means of a servomotor 30 via a reducer 32. The unwinding and winding up of the cable 18 from and onto the drum 20 are measured by two detectors 34 and 36 which sense the angular positions of the driving axle of the drum 20. The detector 34 is a level transmitter which supplies the measuring signals corresponding to the level 12 of the charging surface, while the detector 36 is an electromechanical cam-type selector which supplies control signals according to the position of the probe foot 16.

The signals generated by the detectors 34 and 36 are sent to a control unit 38 which supplies the desired-value signals 40 to a static converter 42 which itself controls the speed and torque of the servomotor 30. Furthermore, the speed of the latter is measured continuously, and corresponding signals are transmitted to the static converter by a speed transmitter 44. If, in a given position of the probe foot 16 measured by the transmitter 34 or the selector 36, the signal corresponding to the measured speed of the motor 30 and supplied by the transmitter 44 does not correspond to the desired value signal 40 supplied by the control unit 38, the static converter automatically commands a corresponding acceleration or deceleration of the servomotor 30, until the actual speed of the latter corresponds to the desired speed for a given position of the probe foot 16. Thus, the speed variations attributable to the variations in the lowering torque of the probe foot 16 are compensated automatically by means of the regulating loop, without the need for additional adjustment or calibration.

During the lowering of the probe foot 16, when this touches the charging surface 12 the brake current of the servomotor 30 falls to a very low value, this being easily detectable by the static converter 42. This drop of the brake current causes an automatic switch from the speed-regulating loop to a loop 46 for regulating the motor torque. The desired value of this torque is supplied by the control unit 38 and is transmitted to the servomotor 30 automatically by the static converter 42, the motor being fed with a suitable electrical current determined so as to ensure that the probe foot 16 remains upright on the surface 12, without being lifted from the latter again. From this moment, the probe foot 16 can descend together with the charging surface 12, in order, via the level transmitter 34, to supply a continuous measurement of the level 12. If this level falls below a predetermined value, the probe foot 16 has to be raised in the sleeve 24, in order to begin a session of charging the furnace 10. For the purpose of this raising, under the control of the unit 38, the static converter automatically increases the current of the servomotor 30 to a value necessary to make it possible to raise the probe foot.

At the approach towards the funnel of the sleeve 24, detected by the selector 36, the torque of the servomotor 30 is automatically reduced, in order to slow the raising of the probe foot 16 and make it easier for it to stop in the parking position in the sleeve 24.

If, for the purpose of a probing after a charging session, the new charging level is known approximately from the quantity of material introduced into the furnace, it is possible to lower the probe foot 16 at a relatively high speed and automatically slow its descent as it approaches the charging level 12.

Figure 2:
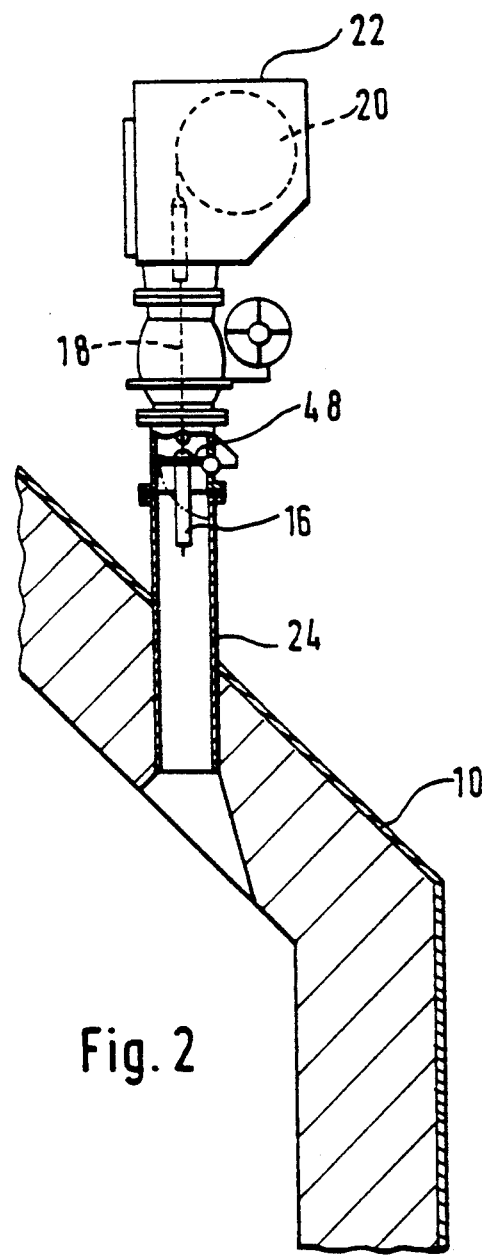
FIG. 2 shows diagrammatically the system for automatic calibration in the parking position.

There will now be described, with simultaneous reference to FIGS. 2 and 4, an advantageous system for the automatic calibration of the regulating system, in order to adjust the latter to possible elongations of the cable or of the chain 18. For this purpose, there is provided in the sleeve 24, at a level corresponding to the top of the probe foot 16 when the latter is in the reference position, a stop 48 which can consist of two crossmembers, as shown in FIG. 4. This stop 48 is mounted on a horizontal pivot axle 50, so as to be pivotable, either by manual action or by means of a motor, between a horizontal operative position, represented by unbroken lines in FIG. 3, and a vertical inoperative position represented by broken lines. Diametrically opposite the pivot axle 50 are angle-shaped mechanical detents 52 preventing a deflection of the crossmembers of the stop 48 caused by the upper conical part of the probe foot when the latter is in contact with the crossmembers in the event of calibration.

During normal operation, the stop 48 is in a horizontal position.

After a particular number of operating hours of the probe, for example each week, and in view of the high temperatures in which the probe foot and the chain or cable have to work, it is important to check the elongation of the suspension element 18 for the probe foot and, if necessary, repeat a zero setting of the level transmitters.

For this purpose, the foot 16 is raised at a reduced speed beyond what has been incorrectly displayed as the parking position, until it touches the two crossmembers of the stop 48, this being detected by the speed transmitter 44 of the servomotor, which will indicate "zero speed", or by a current increase detected by the static converter 42.

Figure 3:
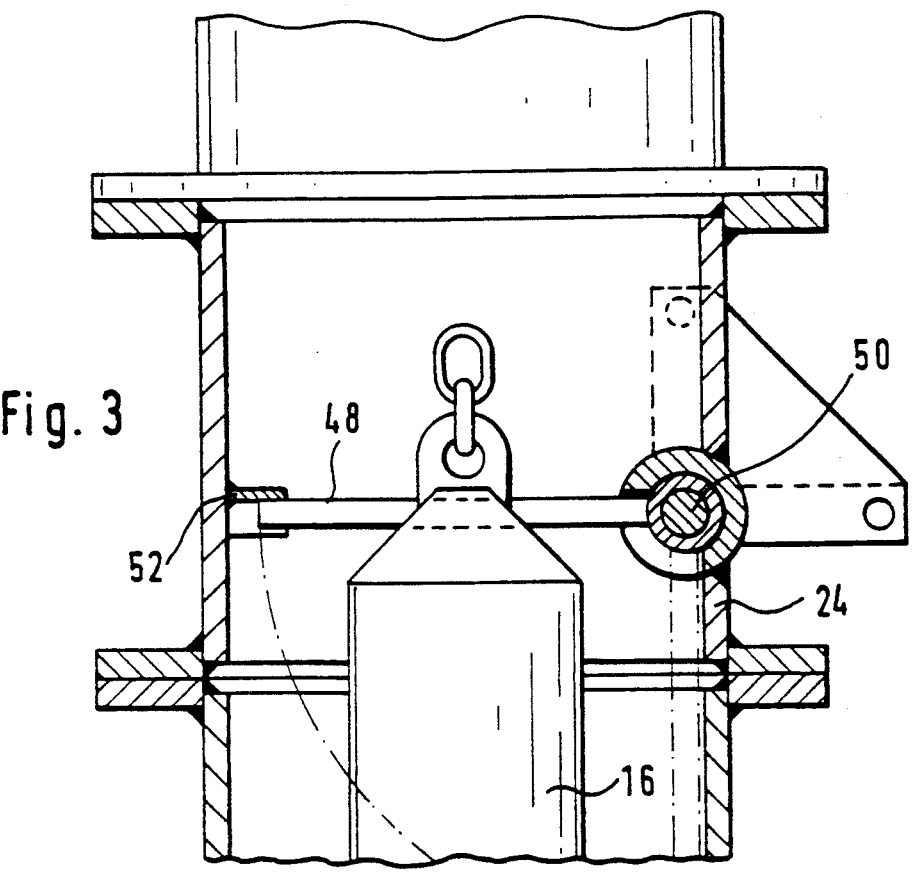
FIG. 3 shows enlarged, details of the limit stop in vertical cross-section.
Figure 4:
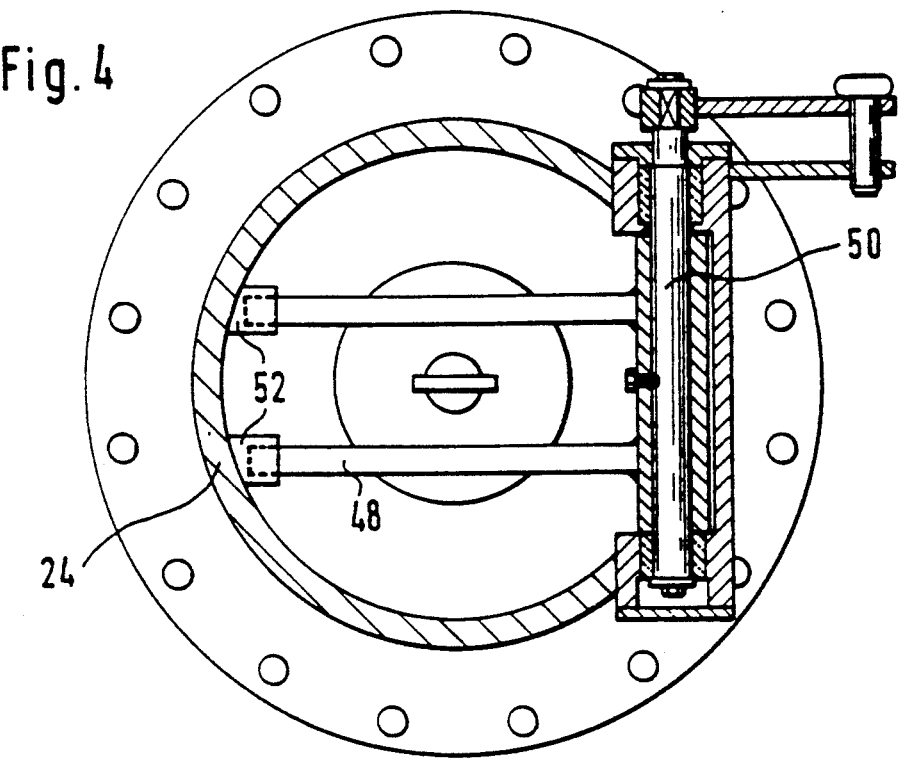
FIG. 4 shows a plan view of the details in FIG. 3.

In this position, the operator can automatically command a new calibration of the system in such a way that the position occupied by the probe foot 16, as shown in FIG. 3, is in fact the reference position and corresponds to the zero value of the level transmitter 34.

In the event of the removal of the probe foot 16, the stop 48 is in the inoperative position, as represented by broken lines, to allow the probe foot to pass.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A level probe for a shaft furnace, said furnace including a wall defining an internal volume within the furnace, said surface being chargeable with material charge and said charge defining within the internal volume of the furnace and an upper charging surface with a descending level between two successive charges of the shaft furnace, said level probe measuring and monitoring the descending level of the charging surface, comprising:

probe foot means for determining said level;
 vertical sleeve means for allowing passage of said probe means through said furnace wall;
 drum means for raising and lowering the probe foot means, said drum means including:
 a sealed chamber communicating the interior volume through said sleeve means,
 a winding drum rotatably mounted within said sealed chamber,
 cable means secured to said winding drum for suspending said probe foot in the interior volume, and
 servomotor means for activating the winding drum, said servomotor means being operable at variable speed and variable torque;
 position detector means for detecting winding and unwinding of the winding drum; and
 control means, responsive to said position detector means, said control means including:
 a first control loop for controlling the speed of the servomotor during the lowering and raising of the probe foot means to, respectively from, said charging surface according to a predetermined relationship between measured probe position and desired speed, said relationship being specific for the downward and the upward movement of the probe foot,
 a second control loop for controlling the torque of said servomotor during surface level monitoring according to a predetermined relationship between probe position and desired torque,
 detection means for detecting moment when the probe foot means touches the charging surface,
 means for automatically passing the control of the servomotor from said first control loop controlling the downward movement of the probe towards the surface to said second control loop when said detection means detects the impact of said probe foot means on said charging surface,
 means for automatically passing the control of he servomotor from said second control loop to said first control loop at a preset probe position, said first control loop then controlling the upward movement of the probe from the surface towards said vertical sleeve means, according to the predetermined relationship between probe position and desired speed for the upward movement.

2. The probe of claim 1, further comprising:
 speed detector means for detecting actual servomotor motor speed, and
 wherein said control means includes static converter means responsive to said position detector means and said speed detector means for controlling feed to the servomotor motor.

3. The probe of claim 2, wherein said control means further comprises:
 torque regulating means, responsive to said position detector, for controlling electrical current supplied to the servomotor motor.

4. The probe of claim 2, further comprising:
 limit means, disposed with said sleeve means, for fixing a reference position for the probe foot means.

5. The probe of claim 4, wherein the reference position is detected by said speed detector means and corresponds to an output signal of said speed detector means indicative of zero speed.

6. The probe of claim 5, wherein the output signal indicative of zero speed provides a calibration signal for said position detector means.

7. The probe of claim 4, wherein the reference position is detected by an increase in current supplied to the servomotor motor.

8. The probe of claim 7, wherein the increase in current supplied to the servomotor provides a calibration signal for the position detector means.

* * * * *

UNITED STATES PATENT AND TRADEMARK OFFICE
CERTIFICATE OF CORRECTION

PATENT NO. : 5,166,589

DATED : November 24, 1992

INVENTORS : Emile Breden et al.

It is certified that error appears in the above-identified patent and that said Letters Patent is hereby corrected as shown below:

Col. 5, line 53: Delete "surface" and insert therefor --furnace--.

Col. 6, line 22: Insert --the-- after "detecting".

Col. 6, line 32: Delete "he" and insert therefor --the--.

Signed and Sealed this

Thirtieth Day of November, 1993

Attest:

BRUCE LEHMAN

Attesting Officer

Commissioner of Patents and Trademarks